Oct. 14, 1958  G. J. FAIRBANKS  2,856,484
ELECTRICALLY OPERATED DAMPER FOR SPACE
HEATING AND COOLING SYSTEMS
Filed March 17, 1955  2 Sheets-Sheet 1
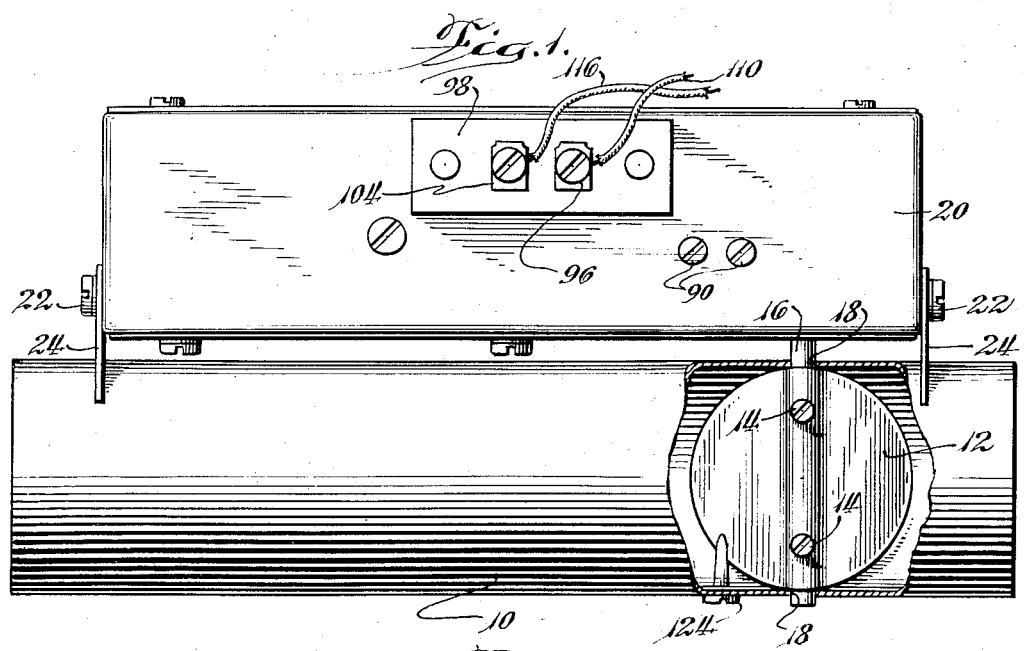
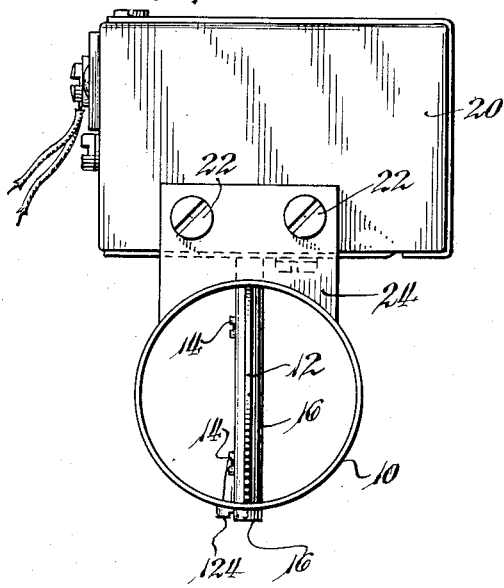

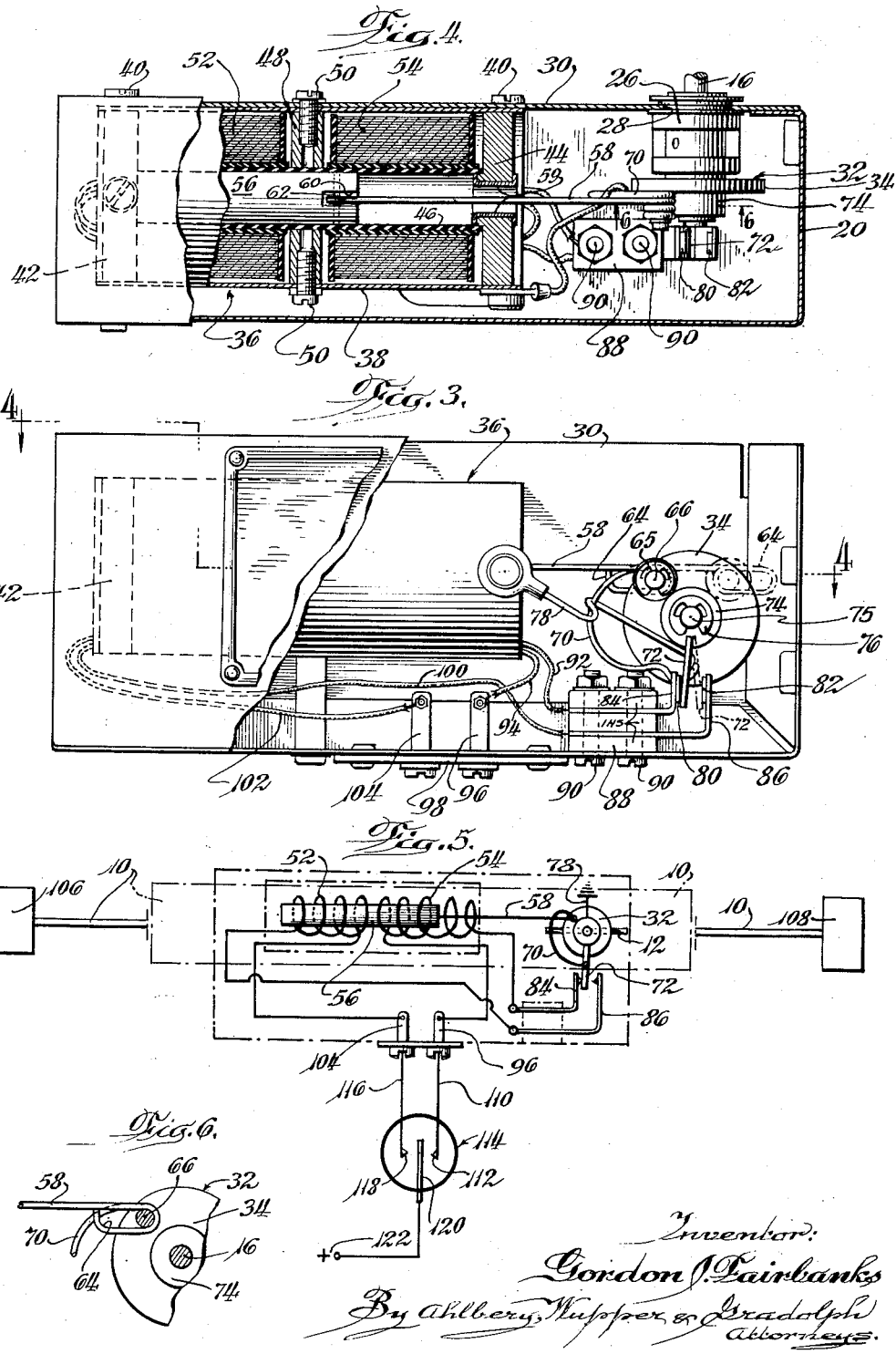

United States Patent Office 2,856,484
Patented Oct. 14, 1958

2,856,484

ELECTRICALLY OPERATED DAMPER FOR SPACE HEATING AND COOLING SYSTEMS

Gordon J. Fairbanks, Indianapolis, Ind., assignor to Stewart-Warner Corporation, Chicago, Ill., a corporation of Virginia Application March 17, 1955, Serial No. 494,915

2 Claims. (Cl. 200—98)

The present invention relates to the control of electrically operated dampers used in the air ducts of space heating and cooling systems.

One object of the invention is to provide for controlling dampers in space heating and cooling systems an improved, highly efficient damper control unit of extremely simple construction which is capable of shifting a damper from either of two extreme positions to the other by the cumulative effect of the magnetic force of a double acting solenoid and the mechanical action of improved structure including means operable as an incident to completion of the damper shifting movement to apply a yieldable mechanical restraint against damper shifting movement in the opposite direction while at the same time serving to deenergize the solenoid and pre-set an electrical circuit through the solenoid in readiness for subsequently effecting in the same manner damper shifting movement in the opposite direction.

Other objects and advantages will become apparent from the following description of the form of the invention illustrated in the drawings, in which:

Figure 1 is a side view of an electrically operated damper unit embodying the illustrated form of the invention;

Fig. 2 is a right end view of the damper unit of Fig. 1;

Fig. 3 is a vertical view of the damper actuator assembly of the unit, certain parts being broken away for clearnes in illustration;

Fig. 4 is a vertical sectional view taken generally along the line 4—4 of Fig. 3;

Fig. 5 is a diagrammatic illustration showing the manner in which the damper unit is interconnected electrically and mechanically into an automatically controlled space heating system; and Fig. 6 is a fragmentary view on an enlarged scale taken along the line 6—6 of Fig. 4 and showing the connection between a solenoid operated link and a damper actuating member.

Referring to the drawings in greater detail, the damper unit forming the illustrated embodiment of the invention comprises a cylindrical duct segment 10, Figs. 1 and 2, adapted to be connected into a longer air supply duct of a conventional space heating or cooling system. The duct segment 10 is opened and closed by a circular sheet metal damper or butterfly valve member 12 having a diameter approximating the inside diameter of the duct segment. The damper disc 12 is attached along its diameter by screws 14 to an operating shaft 16 extending transversely through the duct segment and protruding outwardly through diametrically opposed apertures 18 in the duct segment.

One end of the shaft 16 extends from the duct segment 10 into a rectilinear, sheet metal housing 20 supported by screws 22 on a pair of radial mounting brackets 24 welded to the duct segment. The housing 20 encloses an improved solenoid actuating assembly for the damper shaft 16.

As shown in Fig. 4, the shaft 16 protrudes into the housing 20 through a bushing assembly 26 mounted in an opening 28 in the housing panel 30 adjacent the duct 10. Inwardly of the bushing 26 the shaft is nonrotatably fixed to a circular actuator 32, Fig. 4, having a radial flange 34 of substantial diameter.

The actuator 32 is energized to shift the damper member 12 from one operating position to another by means of a reversing solenoid asembly 36, Figs. 3 and 4, mounted within the housing 20.

In the preferred construction shown, the solenoid assembly 36 comprises an elongated, cylindrical shell 38 fixed to the housing 20 by screws 40. The shell 38 is spaced substantially from the shaft 16 in a position such that the extended axis of the shell is disposed at one side of the shaft 16 in perpendicular relation to the shaft. Two disc-shaped end assemblies 42, 44 fitted into opposite ends of the shell 38 support the respective ends of a cylindrical guide tube 46 concentric with the axis of the shell. The tube 46 is formed of a nonmagnetic material. An annular separator member 48 extends radially between the inner surface of the shell 38 and the longitudinal central portion of the guide 46. The separator is fixed in place by screws 50 extending through the shell 38 and threaded into the separator.

Two separate solenoid winding assemblies 52, 54 of cylindrical shape are fitted around the central guide 46 between the separator 48 and the respective end assemblies 42, 44. As will be presently described in greater detail, these windings are used alternately to exert longitudinal forces in opposite directions on a cylindrical core 56 of magnetic material slidably mounted within the guide 46. The length of the core 56, Fig. 4, is substantially less than that of the guide 46, thus providing clearance for a longitudinal shifting movement of the core within the guide.

Axial translation of the core 56 is transmitted as an angular turning movement to the actuator 32 by means of a connecting link 58, Figs. 3, 4 and 6, extending through a central opening 59 in the end assembly 44. One end of the link 58 is curled into an eyelet swingably supported in a slot 60 in the adjacent end of the core 56 by means of a transverse pin 62 in the core.

The opposite end of the link 58 is shaped to form a larger eyelet 64 which is held by a snap washer 65 on a stub pin 66 fixed to the actuator flange 34 in parallel, radially spaced relation to the axis of the shaft 16. The eyelet 64 is elongated longitudinally of the link 58 to allow substantial longitudinal "lost motion" of the link and core 56 in relation to the pin 66.

As will presently appear, the actuator 32 is rotated reversely through an angle of approximately ninety degrees to shift the damper member 12 between open and closed positions. The pin 66 is located circumferentially on the actuator flange 34 to travel, upon normal operation of the actuator 32, substantially equal distances to opposite sides of a plane extending through the axis of the shaft 16 in perpendicular relation to the extended axis of the solenoid core guide 46.

The pin 66 to which the link 58 is connected also serves an an anchor for one end of a C-shaped spring 70 which operates in a manner to be presently described in greater detail to complete a rotary shifting movement of the actuator 32 initiated by the solenoid assembly 36 and to automatically operate reversing switch means used in controlling the solenoid assembly.

As shown in Fig. 3, the end of the spring 70 opposite the anchoring pin 66 is hooked into a switch contact blade or arm 72 extending radially from a hub 74 journaled for free rotation on the end of a stub shaft 75 on the inner end of the actuator 32 projecting into the housing 20. The hub is held on the shaft by a snap washer 76. The switch contact blade 72 is grounded by a conductor 78 to the solenoid shell 38.

The free end of the contact blade 72 extends between two contacts 80, 82 spaced apart in opposing relation to each other. The contacts 80, 82 are fixed respectively to two parallel legs of two L-shaped conductors 84, 86 supported by a laminated insulating block 88 attached to one side of the housing 20 by bolts 90.

The contact 80 on the solenoid side of the blade 72, Fig. 3, is connected through the conductor 84 and an attached conductor wire 92 to one end of the coil of the solenoid assembly 54 adjacent the shaft 16. Another conductor wire 94 leading from the opposite end of the same solenoid coil is connected to a terminal 96 protruding inwardly from a terminal panel 98 on the side of the housing 20.

The other contact 82, more remote from the solenoid assembly 36, is connected through the conductor 86 and an attached conductor wire 100, Fig. 3, to one end of the coil of the solenoid assembly 52 more remote from the shaft 16. Another conductor lead 102 connected with the opposite end of the same coil is attached to the inwardly protruding end of another terminal 104 on the terminal board 98.

The interconnections of the damper unit with a space heater system is illustrated diagrammatically in Fig. 5. As indicated, the duct segment 10 is connected to form a part of a longer duct (denoted by the same reference numeral) between a hot air supply unit or heater 106 and an air outlet 108 communicating with the space to be heated. It will be understood that the damper unit can be interconnected in the same manner with a space cooling system.

The terminal 96 is connected by a conductor lead 110, Fig. 5, to one contact 112 of a conventional thermostatic space temperature control unit 114. Similarly the terminal 104 is connected by a conductor lead 116 to a contact 118 of the thermostatic control 114 spaced from the contact 112. A bimetallic control element 120, or the equivalent, in the thermostatic control 114 projects into the space between the contacts 112, 118. The control element 120 responds to an increase in the ambient temperature above a predetermined level to move into engagement with the contact 112 thereby making connection between a suitable direct current power source 122, connected to the bimetallic element, and the coil of the solenoid assembly 54 surrounding the right hand end, Fig. 4, of the core 56. As the ambient temperature of the control 114 decreases below another predetermined value, the bimetallic element 120 moves out of engagement with the contact 112 into engagement with the contact 118, thus establishing a connection between the power source 122 and the coil of the other solenoid assembly 52.

The damper unit is shown in open position in Figs. 1 to 5. It will be noted with reference to Figs. 1 and 2, that a counterclockwise opening movement of the damper member 12, as viewed from above, is terminated by engagement of the member with an abutment formed by the upwardly extending end of a screw 124 threaded into the lower side of the duct segment 10. Upon engagement with the abutment screw 124 the damper member 12 is substantially parallel to the axis of the duct 10, thus providing for substantially unrestricted flow of air through the duct.

The damper is held in this open position by the spring 70, Figs. 3 and 4, which exerts a tension force on the pin 66 along a line of action passing to the left, Fig. 3, of the axis of the shaft 16 to the connection between the spring and the blade 72. The reaction of the spring on the blade 72 holds the blade in engagement with the contact 80 thus grounding the coil of the solenoid assembly 54.

It should be explained that the spacing between the opposed contacts 80, 82, which are located at the side of the shaft 16 generally opposite from the pin 66, is such as to limit angular movement of the contact blade 72 on the shaft 16 to a radial angle substantially smaller than the radial angle through which the pin 66 moves about the axis of the shaft 16 in shifting the damper between open and closed positions.

Upon operation of the bimetallic element 120 to engage the contact 112 as previously explained, Fig. 5, a circuit is established from the power source 122 through the coil of the solenoid assembly 54, connected to ground through the contact 80 in engagement with the grounded blade 72. The magnetic field set up by the energized solenoid assembly 54 exerts a longitudinal force on the core 56 tending to center the core with this solenoid assembly. As a consequence, the core 56 is shifted to the right from the position shown in Figs. 4 and 5.

The lost motion connection between the link 58 and the pin 66, previously described with reference to Figs. 3 and 5, allows the core to gain substantial momentum before movement of the core is transmitted to the actuator 32. The impulse of the moving core 56 and the interconnecting link 58 on the pin 66 supplements the magnetic force of the core assembly 54 to rotate the actuator 32 in the clockwise direction, Fig. 3, against the force of the spring 70 and the inertia of the attached damper structure. The effect of the spring 70 and the inertia of the damper structure in resisting rotation of the actuator 32 both drop off sharply as rotary shifting movement of the actuator progresses away from an initial extreme position.

Moreover, as soon as the pin 66 has been moved sufficiently about the axis of the shaft 16 to carry the line of force of the spring 70 between the pin and the blade 72 to the opposite side of the axis of the shaft 16, the force of the spring 70 on the pin 66 operates to complete the rotary shifting movement of the actuator 32 begun by the solenoid actuator.

Simultaneously with its operation to complete the rotary shifting movement of the actuator 32 to the damper closing position, shown in phantom, Fig. 3, the "over-center" action of the spring 70 shifts the contact blade 72 from engagement with the contact 80 into engagement with the contact 82. The latter position of the blade 72 also is shown in Fig. 3.

This breaks the circuit to the winding of the solenoid assembly 54 and grounds the coil of the solenoid assembly 52 in readiness for subsequent shifting of the damper in the same manner in the opposite direction back to its original open position. Thus, shifting of the damper from one position to another requires only a very brief energization of one of the solenoid assemblies 52, 54. After completion of the damper closing movement, the spring 70 operates to hold the damper actuator 32 in "closed" position and to maintain the blade 72 in engagement with the contact 82. Closing movement of the damper is terminated by engagement of its opposite edges remote from the shaft 16 with the opposed inner surfaces of the duct 10.

Upon engagement of the bimetallic element 120 with the contact 118 of the control unit 114, the damper unit operates to open the duct segment 10 in a manner exactly the reverse of that for closing the damper.

Electrically operated, the damper unit thus formed responds very quickly and dependably to the conventional, thermally responsive space heater control 114 to open and close an air supply duct 10 of a space heating or cooling system to maintain the ambient temperature of the control within a predetermined range of variation. The many functions incident to efficient opening and closing of the damper are performed by a highly simplified combination of multipurpose components, which are well adapted for economical manufacture.

While I have shown and described a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. A damper control unit comprising, in combination, a rotatable damper control element adapted to be connected to a damper, means supporting said element for angular displacement about a predetermined axis reversibly between two extreme damper positions, a reversible solenoid including a core mounted for movement along a predetermined path and a pair of electrical windings centered around spaced segments of said path, an actuator on said control element extending radially from said axis thereof, means providing a lost motion connection from said core to said actuator at a location on the latter radially spaced from said control element axis, a switch contact arm pivotally supported for swinging movement about said control element axis and extending radially from said axis, a pair of electrical contacts positioned with respect to said switch contact arm to limit pivotal movement of the latter in opposite directions to a radial angle with respect to said control element axis substantially less than the angular distance between the two damper positions of said control element, a spring having two ends, one end of said spring being connected to said switch arm in radially spaced relation to said control element axis, means connecting the other end of said spring to said actuator at a location thereon radially spaced from said control element axis, the position of said other spring end relative to said actuator being such that as an incident to rotation of said control element about said axis between said two positions thereof said other spring end is carried across a line extending through said one spring end and said axis, said spring being free to expand and contract without restraint except for said connections of opposite ends thereof to said switch arm and said actuator respectively, and means connecting each of said contacts to the electrical winding which is effective through magnetic action on said core to shift said switch arm into engagement with the other contact.

2. A damper control unit comprising, in combination, a rotatable damper control element adapted to be connected to a damper, means supporting said element for angular displacement about a predetermined axis reversibly between two extreme damper positions, a reversible solenoid including a core mounted for movement along a predetermined path and a pair of electrical windings centered around spaced segments of said path, means interconnecting said core with said control element at a location with respect to the latter radially spaced from said axis thereof, said interconnecting means including means providing substantial lost motion between said core as positioned along said path and said control element as positioned angularly about said axis thereof, movable switch contact means radially spaced from said damper control element axis, a pair of electrical contacts positioned with respect to said switch contact means to limit movements of the latter in opposite directions to a radial angle with respect to said control element axis substantially less than the angular distance between the two damper positions of said control element, a spring having two ends, one end of said spring being connected to said contact means, means connecting the other end of said spring to said control element at a location with respect to the latter radially spaced from the axis thereof, the position of said other spring end relative to said control element being such that as an incident to rotation of said control element about said axis between said two control element positions said other spring end is carried across a line extending through said one spring end and said axis, said spring being free to expand and contract without restraint except for said connections of opposite ends thereof to said contact means and said control element respectively, and means connecting each of said contacts to the electrical winding which is effective through magnetic action on said core to shift said contact means into engagement with the other contact.

References Cited in the file of this patent

UNITED STATES PATENTS

| | | |
|---|---|---|
| 910,058 | Haymond et al. | Jan. 19, 1909 |
| 1,275,766 | Schoenwolf | Aug. 13, 1918 |
| 2,259,973 | Firehammer | Oct. 9, 1939 |
| 2,406,246 | Ogden | Mar. 27, 1944 |
| 2,434,070 | Gross | Jan. 6, 1948 |
| 2,548,617 | Purpura | Apr. 10, 1951 |

FOREIGN PATENTS

| | | |
|---|---|---|
| 164,924 | Switzerland | Jan. 2, 1934 |